United States Patent
Szekely

[11] 3,762,374
[45] Oct. 2, 1973

[54] AUTOMATIC DISPENSING DEVICE FOR PARTICULATE MATERIAL

[76] Inventor: George Szekely, 3123 Bailey Ave., New York, N.Y. 10463

[22] Filed: May 31, 1972

[21] Appl. No.: 258,430

[52] U.S. Cl. .......................................... 119/51.11
[51] Int. Cl. ............................................ A01k 5/02
[58] Field of Search ........................... 119/5, 51.11; 222/70, 161

[56] References Cited
UNITED STATES PATENTS

| | | | |
|---|---|---|---|
| 2,725,852 | 12/1955 | Cramer | 119/5 X |
| 3,371,652 | 3/1968 | Louks et al. | 119/51.11 |
| 3,416,497 | 12/1968 | Riel | 119/51.11 |
| 3,605,697 | 9/1971 | Szekely | 119/51.11 |

Primary Examiner—Louis G. Mancene
Assistant Examiner—J. A. Oliff
Attorney—David Toren et al.

[57] ABSTRACT

An automatic dispensing device for particulate material, such as fish food in a powdered or flake form, includes a clock arranged so that its hands close and open a switch in an electrical circuit. A vibrating device is connected to the circuit for operation when the switch is closed for vibrating a container from which the particulate material is dispensed. The hands on the clock, and particularly the minute hand, is shaped to afford a fine adjustment of the duration of the vibrating action. Further, a container with an agitating member at its outlet affords effective dispensing of individual particles of flake-form fish food under the action of the vibrating device. The agitating member provides a valve-like action at the outlet and can be in the form of a sphere, a cone and other compatible shapes.

18 Claims, 7 Drawing Figures

PATENTED OCT 2 1973      3,762,374
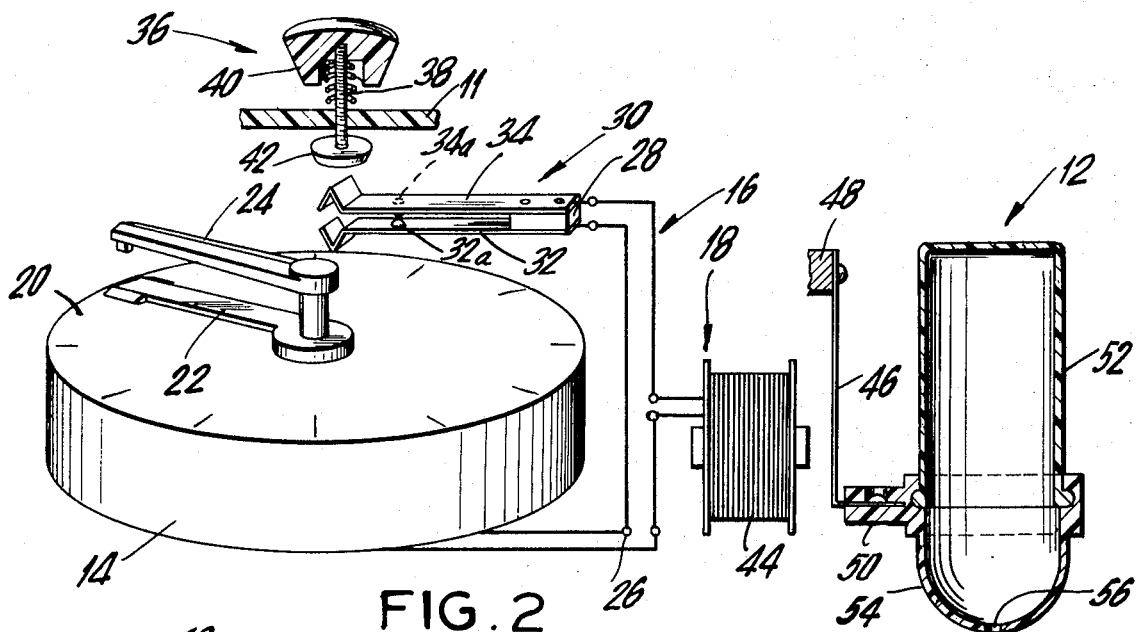
FIG. 2
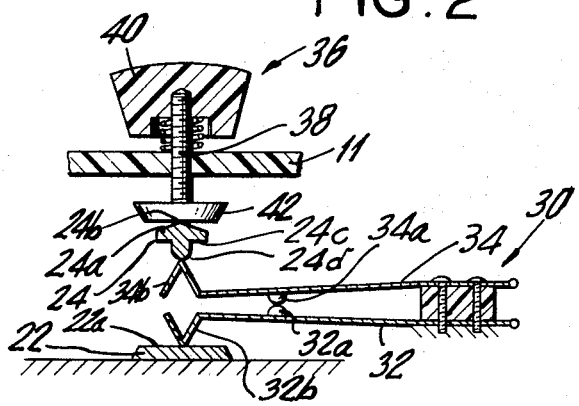
FIG. 3
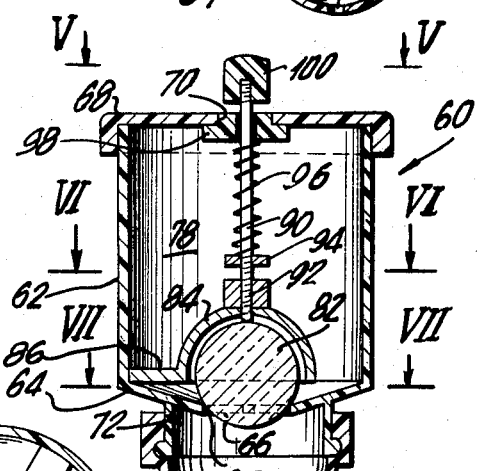
FIG. 4
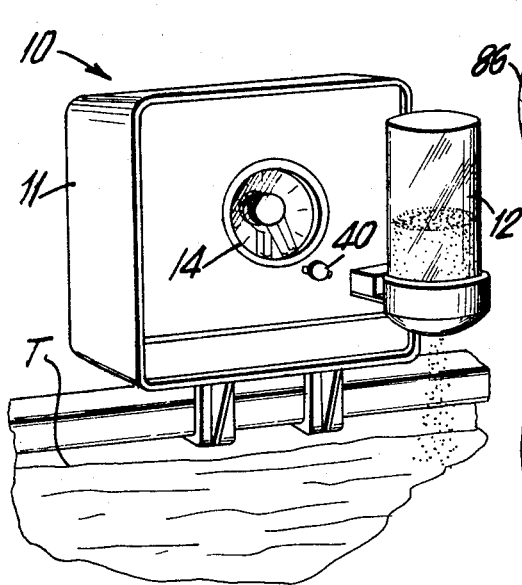
FIG. 1
FIG. 6
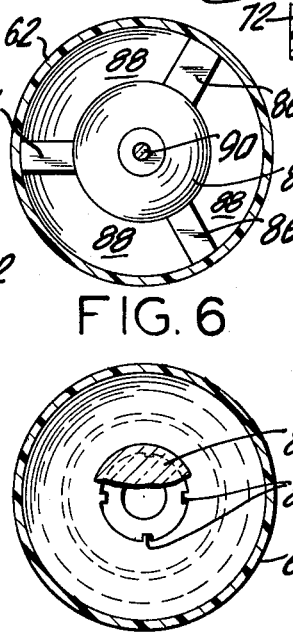
FIG. 7
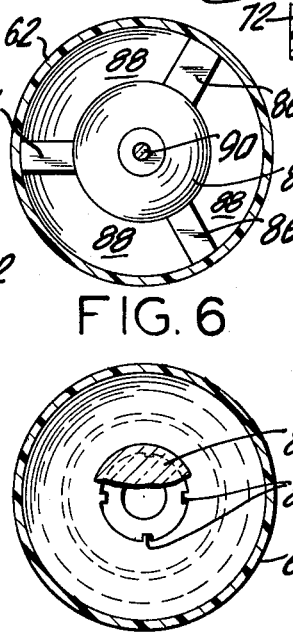
FIG. 5

AUTOMATIC DISPENSING DEVICE FOR PARTICULATE MATERIAL

SUMMARY OF THE INVENTION

The present invention is directed to an automatic dispensing device for particulate material and, more particularly, it concerns a device for automatically dispensing fish food into an aquarium tank.

Fish kept in aquarium tanks should not be fed at one time more food than they normally consume. If during one feeding period food sufficient for several days is dispensed into the tank, it will result in overfeeding and fouling of the tank which factors kill more fish than any other cause. Fish should be fed regularly twice a day and normally the feeding is effected by manually shaking a container to sprinkle the fish food in a particulate form into the tank. In a manual feeding operation the quantity of food dispensed is not uniform from feeding to feeding, and very often it is difficult to maintain a regular feeding schedule.

In the past there have been various automatic fish feeding devices proposed however, generally speaking, they have been unreliable and costly. In my U.S. Pat. No. 3,605,697, issued 9, 20, 1971, an automatic feeder was disclosed in which an alarm clock transmitted a vibrating action to a container for dispensing the fish food into an aquarium tank. Normally, alarm clocks have an alarm which continues operating for about 45 minutes, however, it has been found that sufficient food for a single feeding can be dispensed in about 10 to 20 seconds. Therefore, to adjust conventional alarm clocks to a shorter period for dispensing the fish food, a device was added, note FIG. 4 of my patent, for shortening the period during which the vibration took place.

Therefore, the primary object of the present invention, is to provide an improvement over my patent in which the duration of the vibrating action is achieved by a clock mechanism without the use of an alarm.

Another object of the invention is to provide a special configuration to the hour and minute hands, and particularly to the minute hand, for obtaining a fine adjustment of the time period during which the fish food or other particulate material is dispensed.

Still another object of the present invention is to afford a container arrangement which is particularly useful in dispensing fish food in flake form.

Yet another object is to provide a valve-like member at the outlet from the container which acts as an agitator due to the vibrating action for dispensing individual flakes of the fish food.

Therefore, in accordance with the present invention, the minute and hour hands on a clock are arranged to close and open a switch in an electrical circuit for operating a vibrating device. A container holding the fish food or other particulate material to be dispensed is operatively associated with the vibrating device so that the requisite amount of material is discharged from the container during each period in which the vibrating device is operated by closing the switch. The switch includes a pair of elongated contact springs arranged to be moved toward one another for closing the switch. The ends of the contact springs are positioned in the path of the hands on the clock so that each of the hands contacts one of the springs once during each of its complete paths around the face of the clock. When the hour hand contacts its corresponding contact spring it displaces it toward the other spring without effecting contact. Then, as the minute hand moves past the other contact spring it depresses it so that contact is made and the switch is closed. The time period during which the switch is kept closed is determined by the configuration of the surface of the minute hand in contact with its corresponding contact spring. Further, adjustment of the time period is obtained by a separate mechanism which controls the extent to which the minute hand is depressed toward the contact spring.

To regulate the discharge of the fish food, particularly when it is in flake form, from a container, an agitating member, preferably spherically shaped, is adjustably mounted in an outlet from the container for feeding individual flakes from the container.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a schematic perspective view of a device, embodying the present invention, for dispensing fish food into a tank;

FIG. 2 is a perspective view, partly in section, of a portion of the device shown in FIG. 1 for regulating the period for dispensing food from the container;

FIG. 3 is a sectional view of a portion of the device shown in FIG. 2;

FIG. 4 is a vertical sectional view of another container arrangement for use with the device shown in FIGS. 1 and 2;

FIG. 5 is a sectional view taken along the lines V—V in FIG. 4;

FIG. 6 is a sectional view taken along the lines VI—VI in FIG. 4; and

FIG. 7 is sectional view taken along the lines VII—VII in FIG. 4.

DETAILED DESCRIPTION OF THE INVENTION

In FIG. 1, an automatic dispensing device 10 is shown for supplying controlled quantities of a particulate form fish food, such as powdered or flake form, from a container 12 into an aquarium tank T. The dispensing device 10 includes a clock mechanism 14 for regulating the period during which the container is vibrated to effect the dispensing action.

In FIG. 2, the clock mechanism 14 is shown associated with an electrical circuit 16 into which the vibrating device 18 is connected for transmitting a vibrating action to the container 12 for dispensing particulate form material. As used herein, particulate form material refers to powdered and flake form fish food and other small particle materials.

The clock mechanism 14 consists of a conventional face 20 with an hour hand 22 and a minute hand 24 mounted to move around the face. The hour hand makes one complete sweep of the face each 12 hours while the minute hand makes one complete sweep each hour. As can be seen in the drawing, particularly in FIG. 3, the surfaces of the hour hand and minute hand facing one another are provided with a special configuration for regulating the period in which the vibrating action takes place. The surface 22a of the hour hand is flat and relatively broad or wide as compared with the minute hand. The upper surface of the minute hand has a somewhat flattened V-shaped configuration providing an apex line 24b extending radially along its upper surface. Centered on the lower surface 24c of the minute hand is a downwardly extending projection 24d which is rounded at its end spaced from the lower surface 24c.

In the electrical circuit 16 is a switch 30 consisting of a pair of elongated contact springs 32,34 which extend inwardly over the face of the clock 20 into the path of the hour and minute hands so that as the hour hand sweeps over the face it contacts the spring contact 32 and similarly as the minute hand moves over the face it contacts the spring contact 34. Preferably, the switch 30 can be movably positioned about the face of the clock so that the desired time for the feeding operation can be selected. Alternatively, it would be possible to mount the clock mechanism 14 in the device 10 so that it could be moved relative to the switch held in a stationary position.

On each of the juxtaposed surfaces of the contact springs 32,34, a rounded contact 32a, 34a is provided so that when the contact springs 32, 34 are depressed toward one another by the hour hand 22 and minute hand 24, respectively, the contacts 32a, 34a are disposed in surface contact and close the switch providing a flow of current through the electrical circuit 16. A source of alternating current 26 is provided within the electrical circuit. Further, an insulated holder 28 mounts the outwardly disposed ends of the contact springs 32, 34 at which the connections into the electrical circuit are provided. The ends 32b, 34b of the contact springs 32, 34 which engage the surfaces of the hour hand and the minute hand have a V-shaped configuration so that the apex formed by the V is directed toward the surface of the hand which the contact spring engages.

As can be seen in FIGS. 2 and 3, an adjustment assembly 36 is mounted in the device 10 in alignment with the ends 32b, 34b of the contact springs 32, 34 for adjusting the time period during which the minute hand 24 is maintained in contact with the contact spring 34 for keeping the switch 30 closed. The adjustment assembly consists of a threaded rod or pin 38 in threaded engagement with the casing 11 of the device 10 and with a knob or button 40 located on the end of the rod 38 positioned on the exterior of the casing 11 for threading the rod inwardly or outwardly relative to the casing. Within the casing a guide element 42 is secured to and extends laterally from the pin 38 and provides the contact with the apex 24d on the surface 24a of the minute hand.

As illustrated in FIG. 2, the vibrating device 18 is connected into the electrical circuit so that it is actuated when the switch 30 is closed by the hour hand and minute hand. The vibrating device includes an electrical coil 44 tied into the electrical circuit 16 and an armature spring 46 associated with the coil and connected to a support 50 for the container 12. Further, at the upper end of the armature spring 46, a base 48 is shown for supporting the spring and the structure associated with it. When the switch 30 is closed and alternating current passes through the electrical circuit, the electrical coil or electromagnet 44 causes the armature spring to vibrate and a vibrating action is transmitted to the container 12.

The container 12 consists of a plastic receptacle 52 with a cover 54 mounted on its lower ends. A discharge opening 56 or a plurality of such openings are provided in the cover 54 for dispensing the fish food or other particulate material from the container. Preferably, the container 12 shown in FIG. 2 is used when fish food in a powdered form is dispensed into the aquarium tank T.

In FIGS. 4, 5, 6 and 7, a container 60 is illustrated for use in place of the container 12 when fish food in flake form is being dispensed. Such fish food consists of fatty scales which have a tendency to lump together into larger particles or pieces which interfere with a uniform automatic dispensing operation. Further, if the container is shaken or vibrated the tendency of the flake form particles to stick together is increased. However, if an agitating member is incorporated into the container, during the vibration it tends to comminute or break up the groups of flakes and to feed the individual flake form particles through a dispensing opening. The agitating member provides a valve-like action at the container outlet. Variously shaped agitating members can be used, for example, hemispheres, spheres, cones, frustums of cones, plates and mushroom shaped members.

As shown in FIG. 4, the container 60 consists of a cylindrically shaped member 62 open at its upper end and closed at its lower end by the bottom wall 64 with an opening 66 located centrally in the bottom wall. The snap-on lid 68 forms a closure for the upper end of the cylinder 62 and the lid has an opening 70 located along the central axis of the cylinder. At the lower end of the cylinder a sleeve-like section 72 extends downwardly from the bottom wall 64 and a cap 74 is fitted onto the sleeve-like section and forms, in combination with the bottom of the cylinder 62, an outlet chamber 76 from the container 60.

The cylinder 62 forms a storage chamber 78 from which the flake form fish food is fed through the opening 66 into the outlet chamber 76.

When used in the dispensing device shown in FIG. 1, the container 60 would be supported on the support member 50 and vibrated in an up and down direction, that is in the direction of the central axis of the container, in response to the action of the vibrating device 18.

At the lower ends of the chamber 78, four equiangularly spaced projections 80 are provided on the periphery of the opening 66 extending inwardly toward the axis of the container which extends through the center of the opening. In its rest position, an agitating member provided by a ball or spherically shaped member 82 fits into the opening and rests against or in contact with the projections 80 so that a narrow open passage is provided between the surface of the ball 82 and the periphery of the opening 66. The ball is a solid member formed of glass or a plastic material which is highly polished. Though a spherically shaped member may be preferred under certain conditions, other shapes, as indicated above, can be used. Located above the ball and spaced from it is a hood-shaped member 84 having a hemispherically shaped surface corresponding, in general, to the shape of the ball 82. The hood-shaped member 84 shields the ball 82 from the weight of the material within the chamber 78. About the lower edge of the hood-shaped member 84 and extending outwardly toward the inner surface of the cylinder 62 are three support members 86 equiangularly spaced apart. The inner walls of the cylinder 62, the upper surface of the hood-shaped member 84, and the supports 86 define three outlet paths extending from the lower end of the chamber 78 to the opening 66.

Extending downwardly into the chamber 78 through the opening 70 in the lid 68 is a rod 90 with a threaded section 92 at its lower ends in threaded engagement with and extending through the crown or upper portion of the hood-shaped member 84. The lower end of the rod 90 has a rounded off point which limits the movement of the ball in the upward direction. Secured to the rod 90 at a position spaced above its threaded end 92 is a stop member 94. A spiral spring 96 is positioned about the rod 90 and extends from the upper surface of the stop 94 to the lower surface of a washer 98 which is seated within the opening 70 through the lid 68. The washer 98 has an opening through which the rod extends upwardly above the container 60. On the upper end of the rod 90, above the lid 68, is a knob 100 for adjusting the resilient biasing action provided by the spring 96. By varying the threaded engagement of the threaded end 92 of the rod in the hood-shaped member, the biasing action provided by the spring 96 can be adjusted as well as locating the rounded off point of the rod relative to the ball.

When the container 60 is vibrated, the ball 82 moves in the upward and downward direction due to the vibration and grips individual particles or flakes of the fish food and displaces them through the opening 66 into the chamber 76 from where they drop into the aquarium tank T. By adjusting the biasing action afforded by the spring 96, the oscillating amplitude of the ball 82 can be varied and the extent or manner in which the individual flakes are displaced into the outlet chamber 76 can be controlled. The ball 82 is a solid member so that it is relatively heavy and will return to its position within the opening 66 when it is at rest. In addition to its vibratory or oscillatory movement, the ball also effects a rotational movement so that the individual flakes of fish food which adhere to its surface are removed.

Frequently, due to vibration, the individual flakes develop an electrostatic charge which, in turn, causes the individual flakes to adhere to one another in a chain-like manner and pass through the container as such a chain. To avoid this effect, the rod 90 is formed of a metallic material.

In operating the dispensing device, the switch is positioned to be intercepted by the hour hand 22 and the minute hand 24 at a particular time. Initially the flat surface 22a of the hour hand contacts the V-shaped end 32b of the contact springs 32 and moves or depresses it toward the other contact spring 34. The extent to which the hour hand depresses the contact springs 32 is insufficient to provide engagement between the contacts 32a and 34a. As the minute hand 24 starts to pass over the hour hand its projection 24d contacts the apex of the V-shaped end 34 of the contact spring 34 and displaces it toward the other contact spring so that the contacts 32a, 34a are in engagement and close the switch 34 operating the vibrating device 18 and thereby effect a dispensing action of the particulate material within the container 12 or 60. As can be seen in FIG. 3, the surface of the minute hand on its projection 24d which contacts the end 34b of the contact spring is rounded and thereby affords a variable time period in which the contacts 32a and 34a can be held in engagement. By means of the adjustment assembly 36, the position of the minute hand relative to the end 34b of the spring 34 can be varied. In accordance with the extent to which the minute hand 24 is depressed downwardly toward the contact spring 34 the apex of the V-shaped end 34b of the contact springs will engage the rounded projection 24d at its lowermost surface as viewed in FIG. 3 or at a position spaced above its lowermost surface so that the time in which the minute hand contacts the contact spring is increased.

After determining the time at which the food is to be dispensed, by means of the adjustment assembly 36 the duration of the time during which the dispensing takes place can be regulated. This adjustment can be made quickly on a trial-and-error basis. Further, when the flake form particulate material is being dispensed the biasing action provided by the springs 96 can also be adjusted to afford the proper flow of the individual flakes into the outlet chamber 76 and then into the tank T.

It should be noted that the switching movement provided by the hands and the contact springs amount to only several tenths of a millimeter. Further, the electric current required for the vibrating device is so small that troublefree operation is assured.

While specific embodiments of the invention have been shown in detail to illustrate the application of the inventive principles, it will be understood that the invention may be embodied otherwise without departing from such principles.

What is claimed is:

1. An automatic dispensing device for dispensing particulate material including a clock having an hour hand and a minute hand, an electrical circuit including a switch closable and openable by the operation of said clock, vibrating means associated with said electrical circuit for actuation upon closing of said switch and for deactivation upon opening of said switch, and a dispensing container associated with said vibrating means for dispensing a particulate material from said container when vibrated by said vibrating means, wherein the improvement comprises: said hour hand and said minute hand being disposed in spaced relationship when one is aligned opposite the other as the minute hand crosses the path of said hour hand once each hour, said switch includes a first elongated contact spring and a second elongated contact spring arranged in juxtaposed spaced relationship to one another with oppositely disposed surfaces on said springs positioned between said hour hand and said minute hand once during each complete cycle of movement of said hour hand on said clock, said first elongated contact spring having a first contact and said second elongated contact spring having a second contact, said hour hand contacting and displacing said first contact spring towards said second contact spring as it moves past said first contact spring, said minute hand contacting and displacing said second contact spring toward said first contact spring to engage said first and second contacts for closing said switch, and means associated with said minute hand for adjusting the period of contact between said minute hand and said second contact spring.

2. An automatic dispensing device, as set forth in claim 1, wherein said means associated with said minute hand comprises a stationary support spaced from said minute hand, a member movably mounted in said support and arranged at one end to contact said minute hand and adjustably move said minute hand selectively one of toward and away from said second contact springs.

3. An automatic dispensing device, as set forth in claim 2, wherein said member has a rod-like configuration and is threaded into said support and a knob is mounted on the opposite end of said member from the end arranged to contact said minute hand for manually adjusting the extent to which said minute hand is displaced into engagement with said second contact spring as it moves between said member and said second contact spring.

4. An automatic dispensing device, as set forth in claim 3, wherein the surface of said minute hand arranged to contact said second contact spring is shaped for varying the period of contact between said minute hand and said second contact spring.

5. An automatic dispensing device, as set forth in claim 4, wherein the surface of said minute hand arranged to contact said second contact spring has a projection extending from said minute hand toward said second contact spring and the surface of said projection arranged to contact said second contact spring is rounded in a plane extending transversely of the axis of said minute hand so that by depressing said minute hand toward said second contact spring the surface of contact of said projection with said second contact spring is increased.

6. An automatic dispensing device, as set forth in claim 5, wherein said hour hand has a flat surface arranged to contact said first contact spring and the length of the line of contact between the flat surface of said hour hand and said first contact spring as said hour hand moves is greater than the length of the line of contact between said projection on said minute hand and said second contact spring.

7. An automatic dispensing device, as set forth in claim 6, wherein the surface of said first and second contact springs arranged to be contacted by said hour hand and minute hand, respectively, is V-shaped with the apex of the V-shaped configuration directed toward the one of said hour hand and minute hand which it contacts.

8. An automatic dispensing device, as set forth in claim 7, wherein a surface of said minute hand arranged to contact the one end of said member is shaped to provide a line of contact therebetween.

9. A dispensing device, as set forth in claim 8, wherein a contact element is secured to the one end of said member and has a greater diameter than and extends laterally outwardly from said member and has a flat surface for contacting said minute hand.

10. A dispensing device, as set forth in claim 1, wherein said container comprises first wall means forming an upright storage chamber with an opening at its lower end, said chamber arranged to hold a quantity of particulate materials to be dispensed from said container, second wall means secured to said first wall means and located below the opening in the lower end of said storage chamber, said second wall means forming an outlet chamber arranged in communication with said storage chamber for receiving particulate material through the opening in the lower end of said storage chamber, said second wall means having an opening for discharging particulate material from said container and means positioned within said upright chamber for facilitating the passage of particulate material from the storage chamber into the outlet chamber, said means within said upright chamber including an element arranged for at least partially closing the opening from the storage chamber and for regulating the passage of the particulate material into the outlet chamber, said element arranged to be displaced in the upright direction in response to the vibrating action of said vibrating means for movement upwardly out of and downwardly into the opening in the lower end of the storage chamber for separating individual particles of the particulate material and feeding the individual particles to said outlet chamber.

11. An automatic dispensing device, as set forth in claim 10, wherein said element is spherically shaped and said means within said upright chamber holds said element in the opening in the lower end of the storage chamber when said vibrating means is deactivated.

12. An automatic dispensing device, as set forth in claim 11, wherein said means within said upright chamber comprises a hood positioned within the storage chamber and having a hemispherical surface having a radius similar to and arranged in closely spaced relationship above the upper surface of said spherically shaped element, a member secured to and extending through said hood and also toward said spherically shaped element, extending upwardly from said hood, spring means associated with said member secured to said hood for biasing said hood and spherically shaped element in the downward direction, and adjustment means associated with said member secured to said hood and said spring means for varying the biasing action of said spring means and regulating the amplitude of the oscillatory movement of said spherically shaped element under the action of said vibrating means.

13. A dispensing device, as set forth in claim 12, wherein said member secured to said hood is rod-shaped and is in threaded engagement with said hood, said rod-shaped member extends from said hood upwardly through the upper end of said storage chamber, a stop member secured to and extending outwardly from said rod-shaped member at a position spaced upwardly from said hood and below the upper end of the storage chamber, a washer fitted about said rod-shaped member above said stop member within said storage chamber, and a spring encircling said rod-shaped member with its lower end in contact with said stop member and its upper end in contact with said washer for displacing said washer against the upper end of said storage chamber.

14. An automatic dispensing device, as set forth in claim 13, wherein said first wall means includes a removable cover forming a closure for the upper end of said storage chamber, said cover having an opening therethrough and said rod-shaped member extending upwardly through the opening with its upper end positioned above said cover, a grip secured to the upper end of said member for adjustably threading it relative to said hood for varying the spring biasing action on said hood and said spherically shaped member and positioning the lower end of said member relative to said spherically shaped member.

15. An automatic dispensing device, as set forth in claim 14, wherein said first wall means includes a plurality of angularly spaced projections extending inwardly into the opening of the lower end of said storage chamber, said projections arranged to contact the surface of said spherically shaped member and to space it from the surface defining said opening to provide a space between said spherically shaped member and the surface forming said opening.

16. An automatic dispensing device, as set forth in claim 15, wherein said hood is spaced inwardly from the inner surface of said storage chamber and three equiangularly spaced support members are secured to and extend outwardly from the lower end of said hood to the inner surface of said storage chamber, and said support members are arranged to seat against the lower end of said storage chamber, and the inner surface of said storage chamber, said support members and the outwardly facing surfaces of said hood defining passageways about said hood downwardly to the opening from the lower end of the storage chamber.

17. An automatic dispensing device, as set forth in claim 16, wherein said second wall means are removably secured to the lower end of said first wall means by a snap lock engagement.

18. An automatic dispensing device, as set forth in claim 16, wherein said spherically shaped member is solid and is formed of one of glass and a plastic material and has a highly polished surface.

* * * * *